(12) United States Patent
Herrema et al.

(10) Patent No.: US 11,390,359 B2
(45) Date of Patent: Jul. 19, 2022

(54) WATERCRAFT DRAIN PLUG SYSTEM

(71) Applicant: Flow-Rite Controls, Ltd., Byron Center, MI (US)

(72) Inventors: Mark W. Herrema, Rockford, MI (US); Dennis J. Anderson, Coopersville, MI (US); Myles A. Brown, Holland, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 38 days.

(21) Appl. No.: 17/095,347

(22) Filed: Nov. 11, 2020

(65) Prior Publication Data

US 2022/0144383 A1    May 12, 2022

(51) Int. Cl.
*B63B 13/00* (2006.01)
*F16K 31/44* (2006.01)
*F16K 31/46* (2006.01)

(52) U.S. Cl.
CPC .............. *B63B 13/00* (2013.01); *F16K 31/44* (2013.01); *F16K 31/46* (2013.01)

(58) Field of Classification Search
CPC ......... B63B 13/00; F16K 31/00; F16K 31/44; F16K 31/445; F16K 31/46; F16K 31/465
USPC ....................................................... 114/197
See application file for complete search history.

(56) References Cited

U.S. PATENT DOCUMENTS

| 3,217,685 | A | 11/1965 | Mueller |
| 5,048,556 | A * | 9/1991 | Grumelot ............... B63B 13/00 114/197 |
| 7,946,238 | B2 | 5/2011 | Colsher et al. |
| 9,115,822 | B2 | 8/2015 | Gray |

FOREIGN PATENT DOCUMENTS

| EP | 1213732 | 6/2002 |
| GB | 444126 | 3/1936 |

OTHER PUBLICATIONS

Flowritecontrols. Remote Drain Plug Webinar. YouTube. Oct. 15, 2020. [retrieved on Oct. 22, 2021]. Retrieved from Internet: < URL:https://www.youtube.com/watch?v=mPwEl1gul6A>. entire video.
International Search Report and Written Opinion for PCT/US2021/046609 dated Dec. 21, 2021.

* cited by examiner

*Primary Examiner* — Lars A Olson
(74) *Attorney, Agent, or Firm* — Warner Norcross + Judd LLP

(57) ABSTRACT

The specification discloses a watercraft drain plug system that includes two or more drain plugs, an actuator, and a cable assembly interconnecting the drain plugs and the actuator. The actuator may be operated to move the drain plugs between open and closed positions. The actuator includes a locking mechanism for securing the actuator in the closed position to prevent inadvertent opening of the drain plugs.

8 Claims, 10 Drawing Sheets

WATERCRAFT DRAIN PLUG SYSTEM

BACKGROUND

The present invention relates to watercraft drain plug systems, and more particularly to such systems including a drain plug that may be actuated from a location different from that of the drain plug.

A recreational watercraft typically includes a removable drain plug, enabling water to be removed from the bilge of the watercraft before transporting or storing the watercraft. To drain the water from the bilge, the drain plug is partially or fully removed, which opens a passageway enabling the water to drain.

Drain plug systems enable the drain plug to be operated by an actuator located separately from the drain plug. One such system is disclosed in U.S. Pat. No. 9,115,822 issued Aug. 25, 2015 to Gray, the disclosure of which is incorporated by reference. The disclosed system includes a drain plug housing to be installed in the transom of the watercraft (i.e. a position similar to that of a conventional threaded plug as described above), a drain plug, an actuator, and a cable interconnecting the actuator and the drain plug. The actuator moves the drain plug by way of the cable. When the actuator moves the drain plug out of the drain plug housing, a passageway is created, enabling the water to drain from the bilge. When the actuator draws the drain plug it into the drain plug housing, the drain plug seals within the drain plug housing, preventing water from entering the watercraft.

Although this drain plug system is an improvement over the traditional threaded plug, this system has two issues. Firstly, the possible locations of the actuator are limited by a practical consideration. Specifically, the actuator should be located where the probability of accidental movement of the actuator is relatively low in order to reduce the possibility of moving the actuator accidentally or inadvertently. If such movement occurs when the watercraft is in the water, the watercraft can fill with water. Consequently, the actuator often is installed in less than optimally convenient location. Secondly, in a watercraft outfitted with multiple drain points (e.g. for faster and/or more complete draining), multiple drain plug systems are required—namely one for each desired drain point.

SUMMARY

The aforementioned issues are addressed by the drain plug system of the present invention.

In a first aspect of the invention, a watercraft drain plug system includes a locking mechanism on the actuator. The locking mechanism reduces the likelihood of accidental or inadvertent movement of the actuator, and thereby reduces the likelihood of accidental or inadvertent opening of the drain plug when the watercraft is in the water.

In a second aspect of the invention, a watercraft drain plug system includes multiple drain plugs actuated by a common actuator. This system reduces the number of actuators and cables within the watercraft. This system also provides for simple actuation of the drain plugs in tandem.

These and other advantages and features of the invention will be more fully understood and appreciated by reference to the description of current embodiments and the drawings.

DESCRIPTION OF CURRENT EMBODIMENTS

I. Introduction

Figure 1:
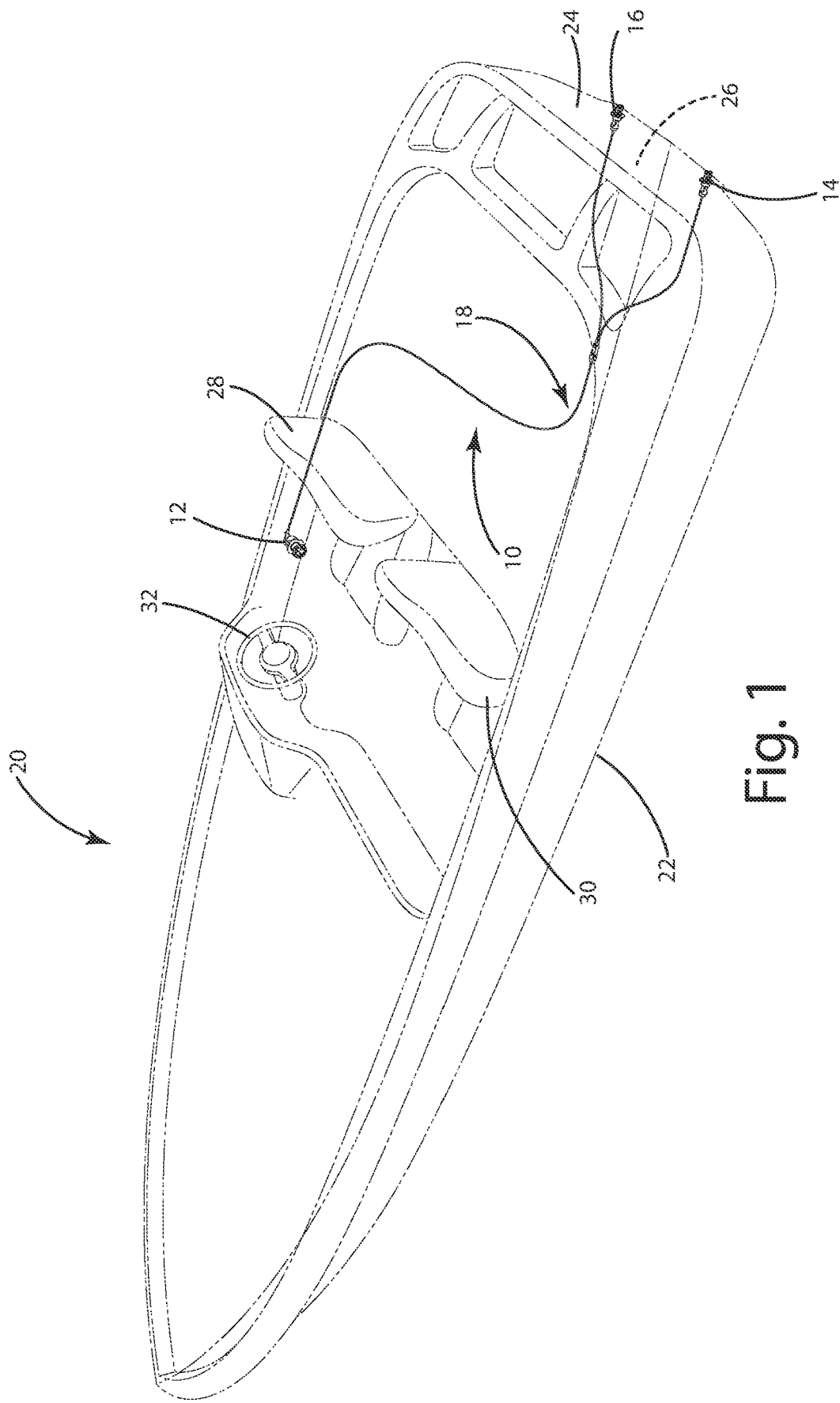
FIG. 1 is a perspective view of the watercraft drain plug system installed within a watercraft (shown in phantom).

Before the embodiments of the invention are described, it is to be understood that the invention is not limited to the details of operation or to the details of construction; and the arrangement of the components set forth in the following description or illustrated in the drawings. The invention may be implemented in various other embodiments and may be practiced or carried out in alternative ways not expressly disclosed herein.

In addition, it is to be understood that the phraseology and terminology used herein are for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one or more of X, Y or Z individually, and any combination of any one or more of X, Y and Z, for example, X, Y, Z; X, Y; X, Z; and Y, Z.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

II. Watercraft Drain Plug System

Figure 2:
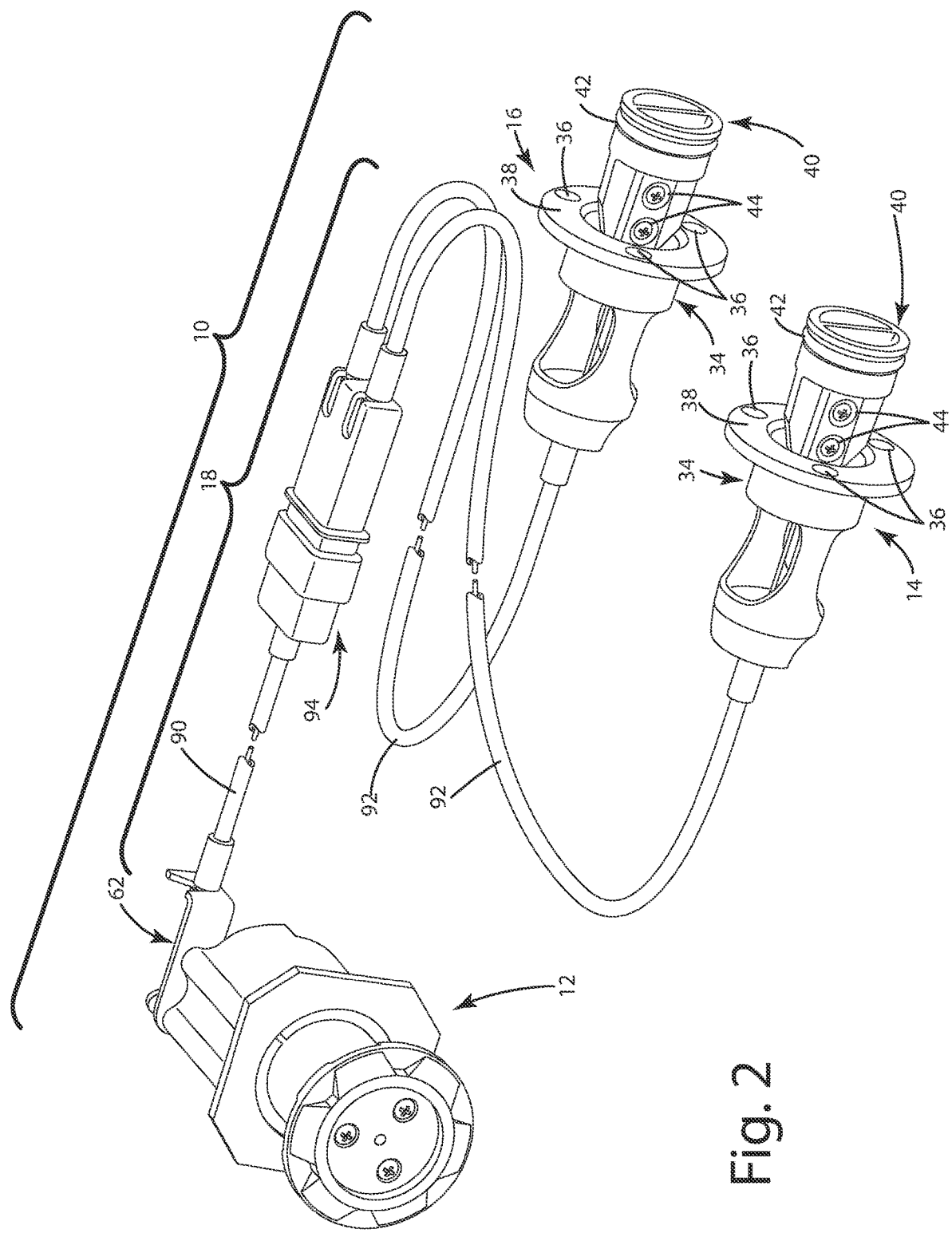
FIG. 2 is a perspective view of the watercraft drain plug system.

A watercraft drain plug system constructed in accordance with a current embodiment of the invention is illustrated in the drawings and generally designated 10. As perhaps most clearly illustrated in FIG. 2, the system 10 includes an actuator assembly 12, two drain plug assemblies 14 and 16, and a cable assembly 18.

With reference to FIG. 1, the system 10 is designed for installation within a watercraft 20 including a hull 22 having a transom 24. A bilge area 26 is defined by the hull 22 within the watercraft 20 in an area near the transom 24. The watercraft 20 may include a driver's (or operator's) seat 28 and a passenger seat 30, as well as other seats. The watercraft also may include a steering wheel 32 in front of the driver's seat 28.

When the system 10 is installed in the watercraft 20, the actuator assembly 12 preferably is mounted in the area of the driver's seat 28; the drain plug assemblies 14 and 16 preferably are mounted in the transom 24; and the cable assembly 18 extends between the actuator assembly and the drain plug assemblies.

Each of the drain plug assemblies 14 and 16 is generally well known to those skilled in the art and, for example, may be of the type disclosed in U.S. Pat. No. 9,115,822. In the currently disclosed embodiment, the drain plug assemblies 14 and 16 are identical to one another. However, the two assemblies could be different from one another. Further, although two drain plug assemblies are shown, any number (e.g. one or more) of drain plug assemblies may be provided.

Each drain plug assembly 14 or 16 includes a drain plug housing 34 adapted to be mounted within the transom 24 and secured to the transom for example using screws (not shown) passing through the holes 36 in the flange 38. Each of the drain plug assemblies 14 or 16 additionally includes a drain plug 40 movable within the respective drain plug housing 34. Each drain plug includes an O-ring 42 for sealing the drain plug 40 within the drain plug housing 34 when the drain plug is in the closed position. Each drain plug 40 further includes screws 44 securing the drain plug to the inner wire of the associated output cable 92 (as will be described).

Figure 3:
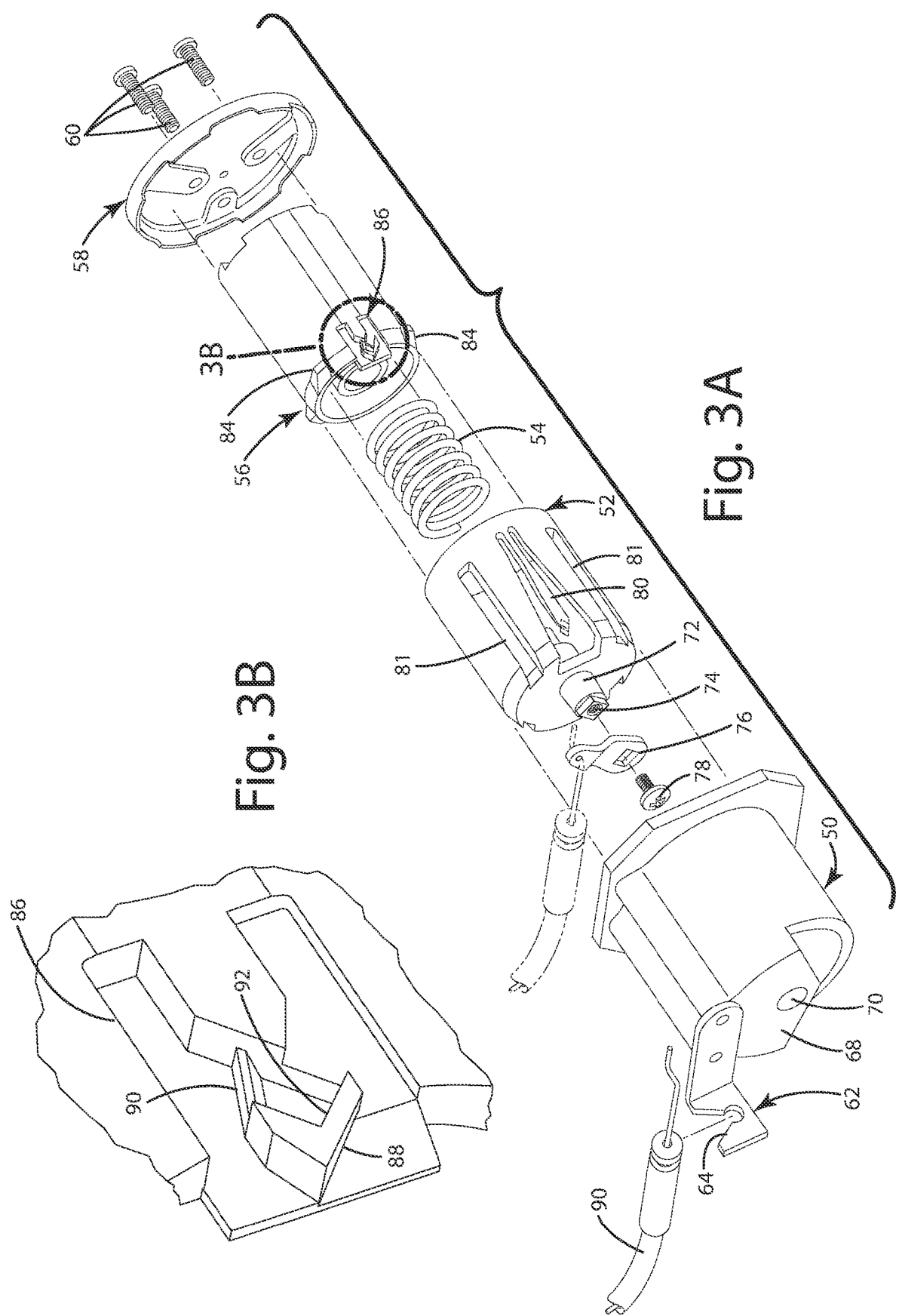
FIG. 3A is an exploded perspective view of the actuator assembly.
FIG. 3B is a partially fragmentary perspective view of the area within circle 3B in FIG. 3A.

With reference to FIG. 3A, the actuator assembly 12 includes (from lower left to upper right) the actuator housing 50, the locking finger cylinder 52, the coil spring 54, the finger lock cylinder 56, and the actuator handle 58. The actuator housing 50 receives the locking finger cylinder 52, which in turn receives the spring 54 and the finger lock cylinder 56. The actuator handle 58 is secured to the finger lock cylinder 56 using screws 60.

The actuator housing 50 is adapted for installation within the watercraft 20. A bracket 62 is secured to the actuator housing 50 by screws (not shown). The bracket 62 includes a slot 64 receiving one end of the inlet cable 90 to secure the inlet cable in a fixed position with respect to the actuator housing 50. The actuator housing 50 additionally includes a bottom wall 68 defining a center hole 70.

The locking finger cylinder 52 is a hollow cylinder including a protrusion 72 having a screw hole 74. In the assembled actuator assembly 18, the protrusion 72 extends through the center hole 70 in the actuator housing 50. The locking finger cylinder 52 is rotatable within the actuator housing 50 between open and closed positions (with open and closed referencing the position of the drain plugs 40). A lever arm 76 is secured to the protrusion 72 by way of a screw 78 in the screw hole 74. The lever arm 76 rotates with the locking finger cylinder 52. The locking finger cylinder 52 additionally includes a resiliently flexible locking finger 80. As seen perhaps most clearly and FIG. 7, the locking finger 80 includes an arrow-shaped nose 82 having a diamond-shaped portion on its "underside" (i.e. the side facing the interior of the locking finger cylinder 52). The locking finger cylinder 52 additionally defines longitudinally oriented keyways 81.

The finger lock cylinder 56 is a hollow cylinder fitting within the locking finger cylinder 52. The finger lock cylinder 56 includes detents 84 that fit within the keyways 81 of the locking finger cylinder 52. Consequently, the finger lock cylinder 56 is prevented from rotating within the locking finger cylinder 52. However, the finger lock cylinder 56 may move axially back and forth within the locking finger cylinder 52. The finger lock cylinder 56 additionally includes on its circumference a finger lock 86, which is shown in greatest detail in FIG. 3B. The finger lock 86 includes a first cam surface 88 a second cam surface 90, and a locking recess 92—all of which cooperate with the locking finger nose during use of the actuator assembly 12 (as will be described).

The coil spring 54 is located within the finger lock cylinder 56 and extends between the locking finger cylinder 54 and the finger lock cylinder 56 to bias or urge the two components away from one another. Although the spring 54 is disclosed as a coil spring, the spring 54 could be any element or combination of elements for biasing or urging the components away from one another.

The cable assembly includes an inlet cable 90, two outlet cables 92, and a cable junction box 94. Each of the cables 90 and 92 is a Bowden cable in which an inner wire is movable within an outer sleeve layer. Such cables are well known to a person of ordinary skill in the art. The inlet cable 90 extends between the bracket 62 of the actuator assembly 12 and the junction box 94. Each of the outlet cables 92 extends between one of the drain plug assemblies 14 and 16 and the junction box 94.

Figure 10:
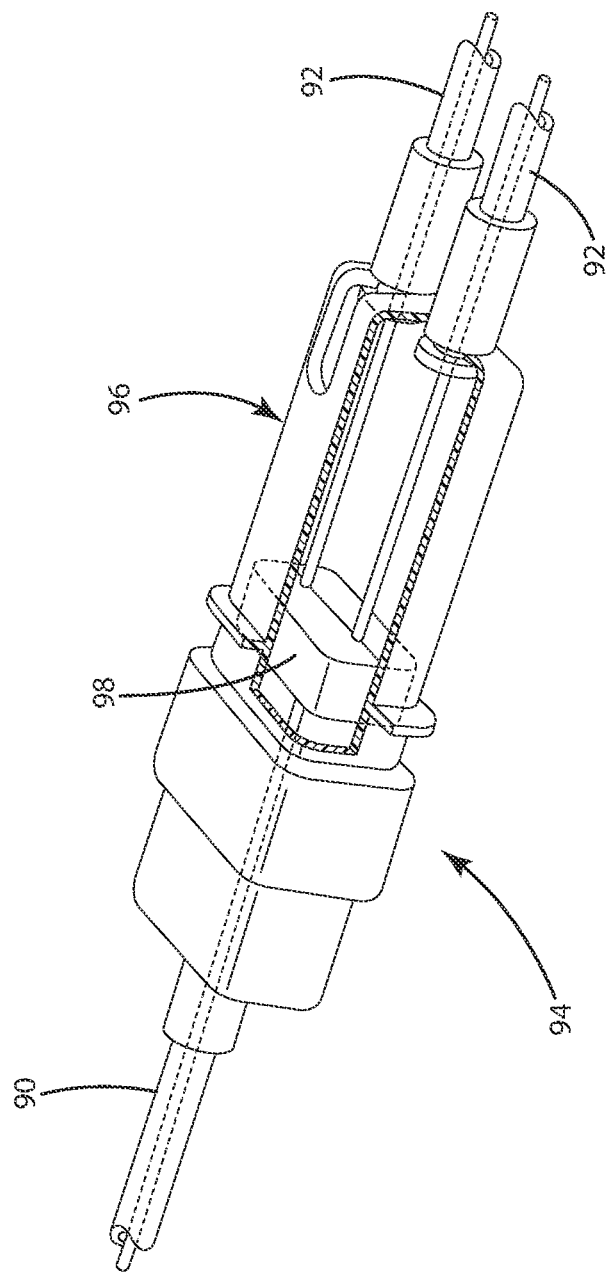
FIG. 10 is a partially sectional perspective view of the cable junction box.

The junction box 94 is illustrated in greatest detail in FIG. 10. The junction box 94 includes a housing 96 and a block 98 slidably movable within the housing. The inner wire of the inlet cable 90 and the inner wires of the outlet cables 92 all are secured within the block 98. Consequently, movement of the inner wire of the inlet cable 90 results in tandem simultaneous movement of the inner wires of the outlet cables 92.

III. Installation and Operation

The watercraft drain plug system 10 is installed within the watercraft 20. Each drain plug assembly 14 or 16 may be installed at a desired location through the hull 22 of the watercraft 20. As disclosed, the drain plug assemblies 14 and 16 are installed within the transom 24 of the watercraft 20. The location of the actuator assembly 12 is selected by the installer. Most commonly, and as disclosed, the actuator is placed in a convenient location within the interior portion of the watercraft 20. As disclosed, the convenient location is in the aria of the driver's seat 12 so as to be readily and easily accessible by the watercraft operator. The cable assembly 18 is routed within the watercraft 20 between the actuator assembly 12 and the drain plug assemblies 14 and 16. Preferably, the cable assembly 18 is installed in a fashion so as to be hidden from view.

The system 10 prevents the accidental or inadvertent operation of the system—and specifically prevents the accidental or inadvertent opening of the drain plugs 14 and 16 when the watercraft 20 is in the water. Further, the system 10 enables the tandem operation of the drain plug assemblies 14 and 16 using the single actuator assembly 12.

Figure 4:
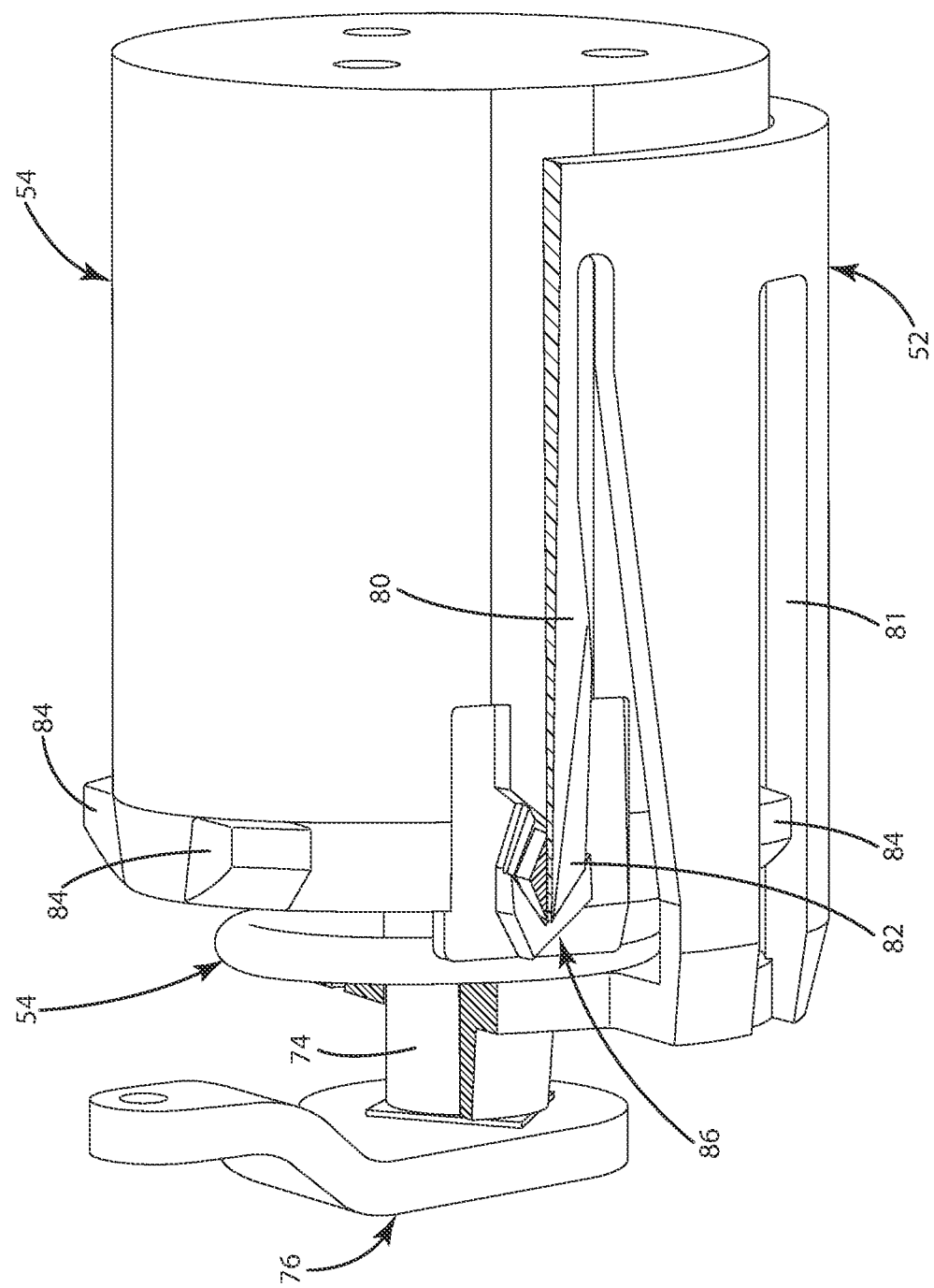
FIG. 4 is a partially fragmentary perspective view of the actuator assembly in the locked position.
Figure 5:
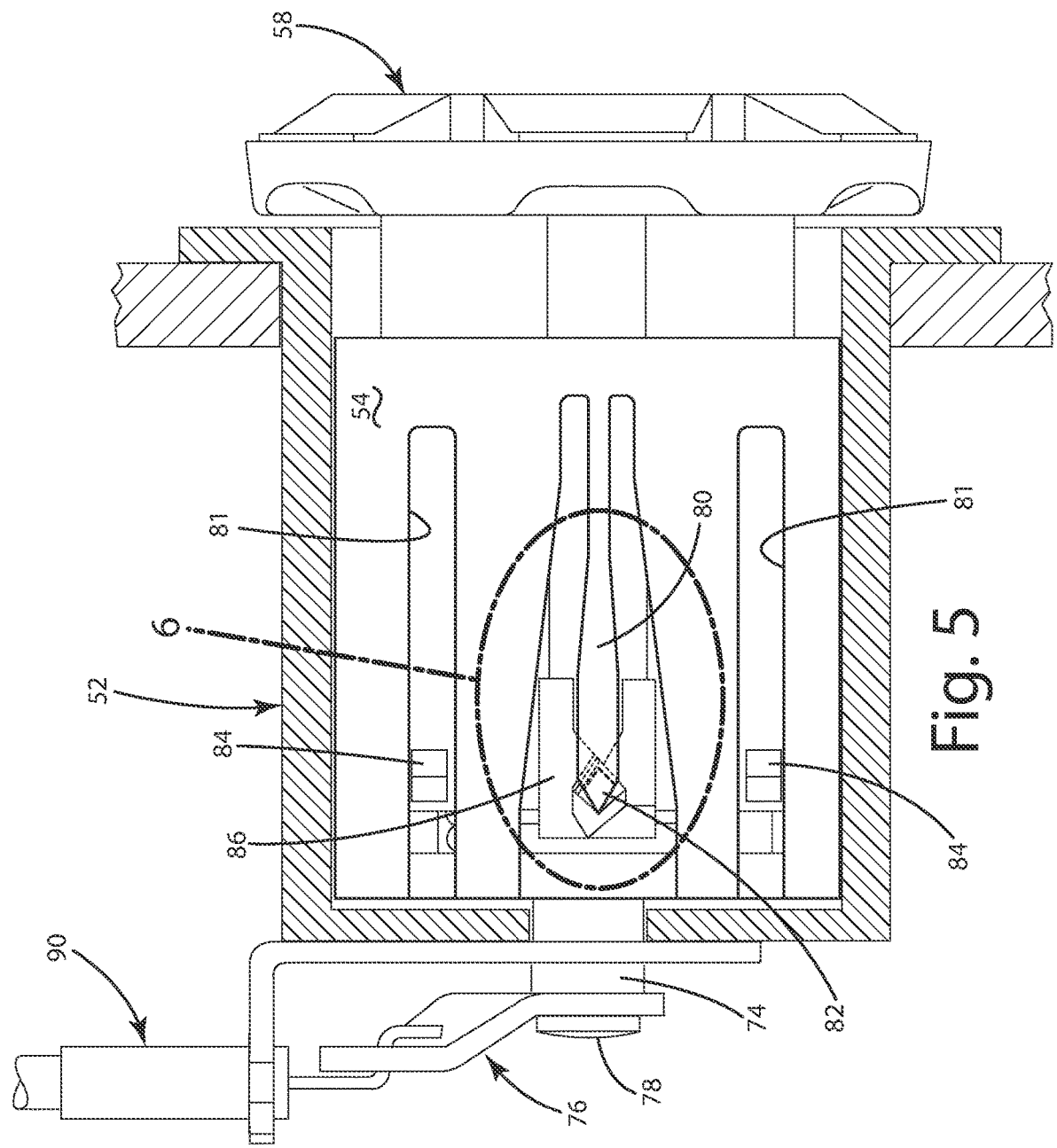
FIG. 5 is a partially sectional view of the actuator assembly in the locked position.
Figure 7:
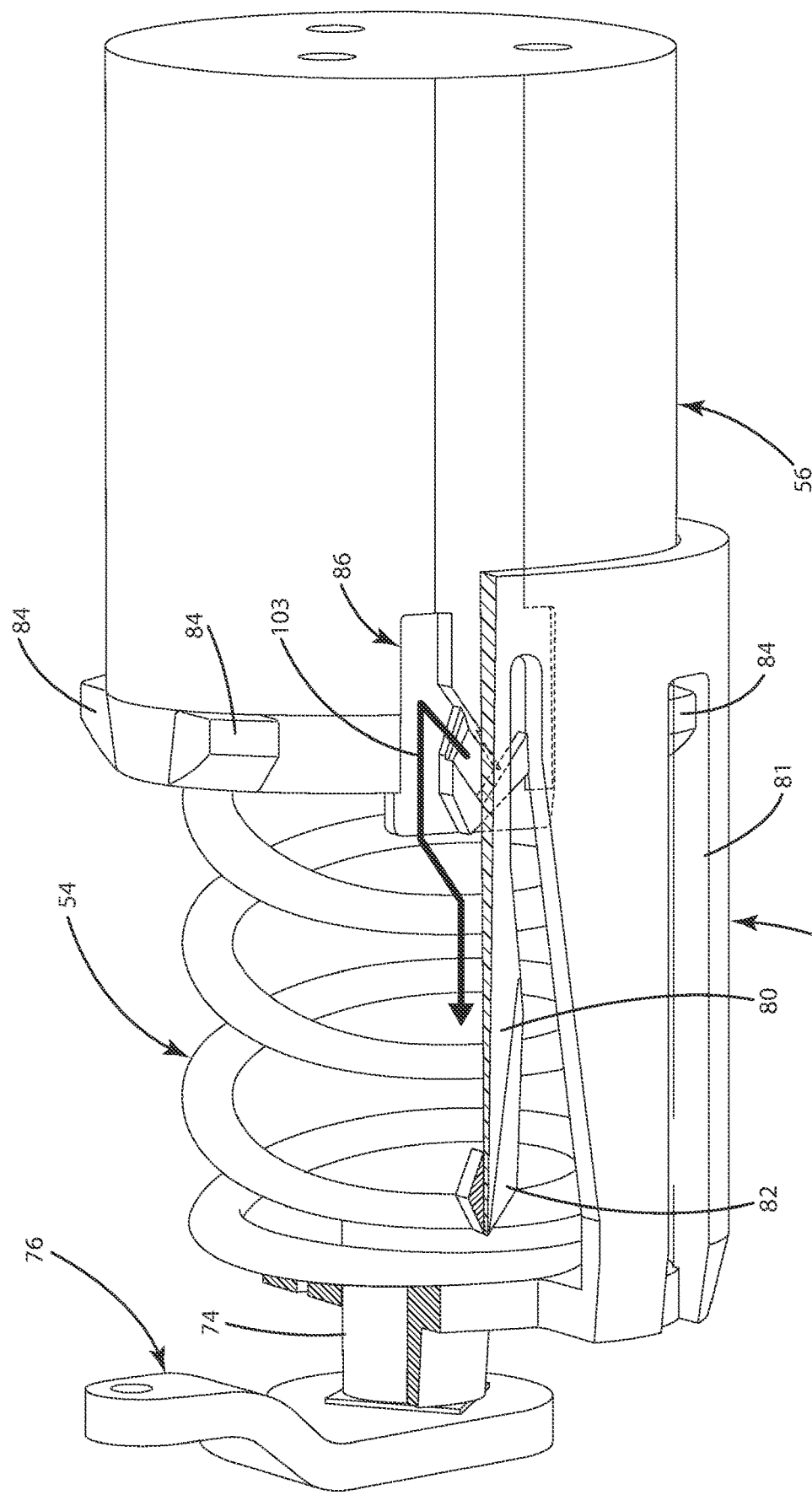
FIG. 7 is a partially fragmentary perspective view of the actuator assembly in the unlocked position.
Figure 8:
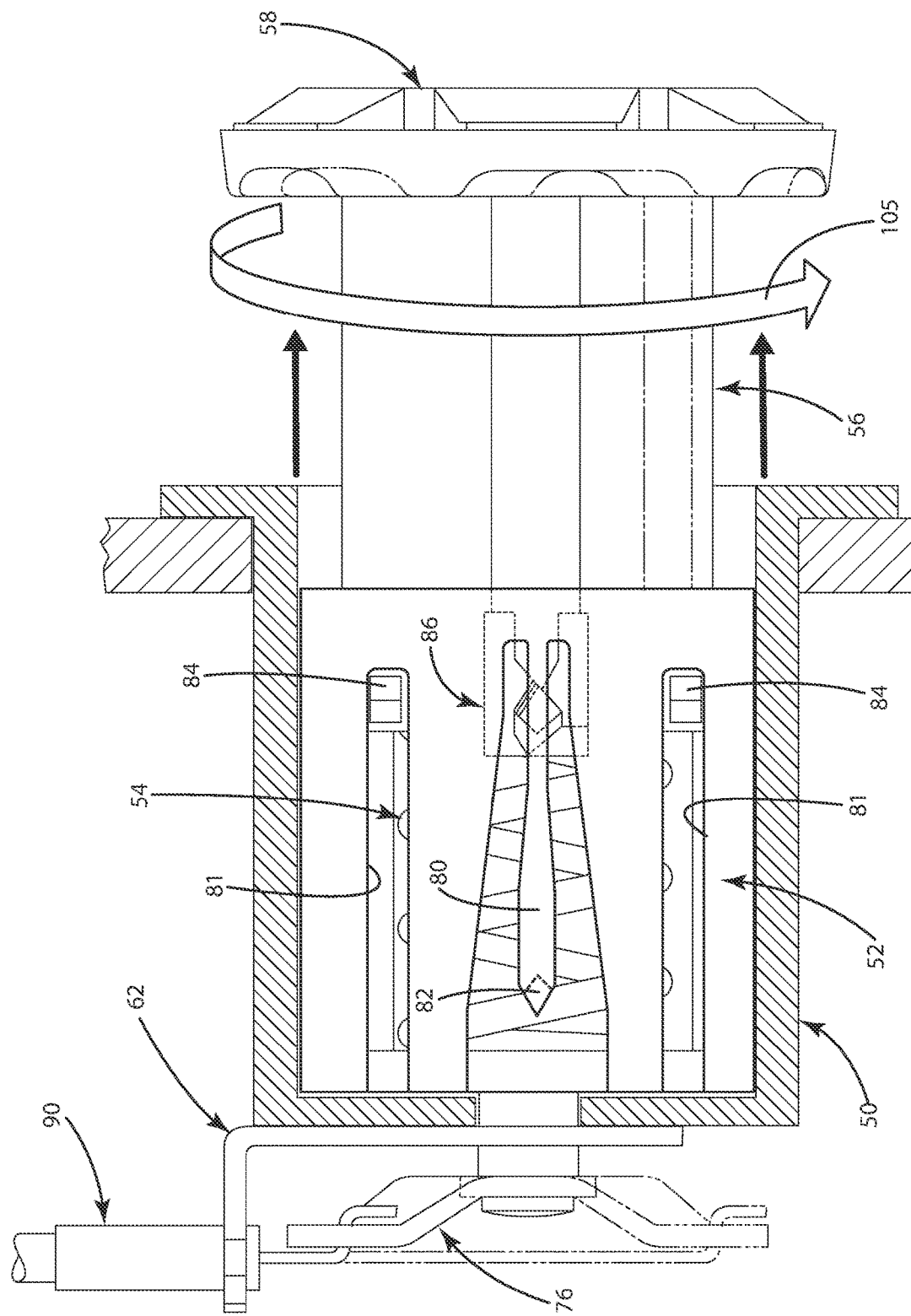
FIG. 8 is a partially sectional view of the actuator assembly in the unlocked position.
Figure 9:
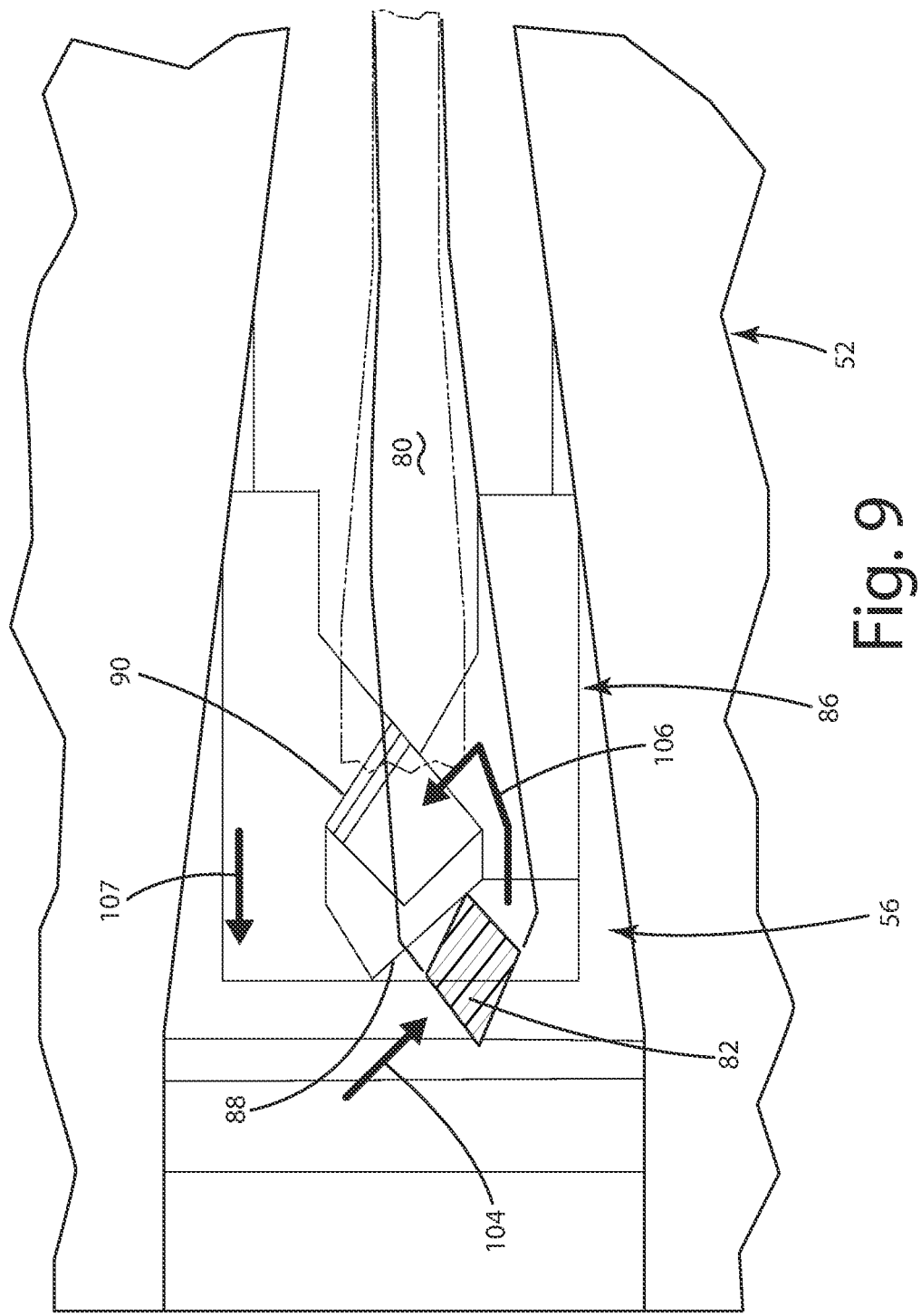
FIG. 9 is an enlarged view of the locking finger and the finger lock showing the movement of the locking finger.

The locking actuator assembly 12 is movable between a locked position (as illustrated in FIGS. 4-5) and an unlocked position (as illustrated in FIGS. 7-9). When the actuator assembly 12 is in the locked position, the actuator handle 58 cannot be rotated, and therefore the drain plugs 40 cannot be moved. When the actuator assembly 12 is in the unlocked position, the actuator handle 58 can be rotated, and therefore the drain plugs 40 can be moved between their open and closed positions.

Figure 6:
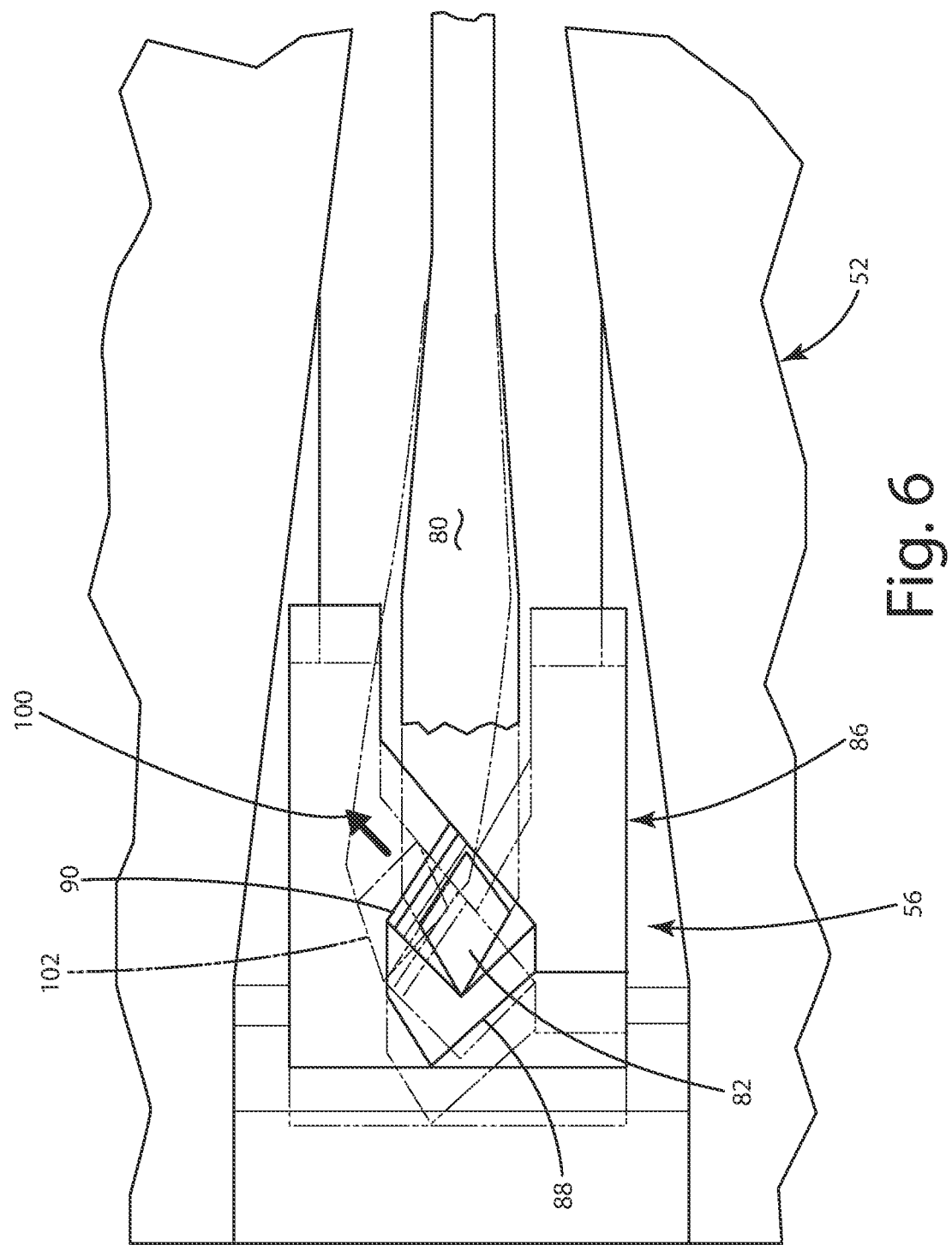
FIG. 6 is an enlarged view of the area within circle 6 in FIG. 5 showing the movement of the elements.

As described above, the finger lock cylinder 56 is spring-loaded within the locking finger cylinder 52. When the actuator assembly 12 is in the locked position, and when the actuator handle 58 is depressed against the force of the spring 54, the locking finger 80 is pushed or deflected, by way of interaction of the locking finger nose 82 and the second cam 90, away from longitudinal alignment of the locking recess 92 with the finger lock 86. As illustrated in FIG. 6, this motion of the locking finger 80 is designated by arrow 100, and the deflected position 102 of the locking finger is shown in phantom. With the locking finger 80 pushed away from the finger lock 84, the spring 54 pushes the finger lock cylinder 56 and the actuator handle 58 outwardly from the locking finger cylinder 52 to move the actuator assembly to the unlocked position. The movement of the finger lock nose from the locked position to the unlocked position is illustrated by arrow 103 in FIG. 7. The actuator handle 58 then may be rotated (as indicated by arrow 105 in FIG. 8) to rotate the locking finger cylinder 52, thereby moving the lever arm 76 to actuate the cable assembly 18, thereby opening or closing the drain plugs 40. In the current embodiment, the handle may be rotated 180 degrees between the open and closed positions, which results in the maximum travel of the inner wire of the inlet cable 90 as may be seen by the open (solid) and closed (phantom) positions of the lever arm 76 in FIG. 8.

To lock the actuator assembly 12 (i.e. to move the assembly to the locked position), the actuator handle 58 is pressed inwardly against the force of the spring 54 in the direction of arrow 107 in FIG. 9. The finger lock nose 82 is pushed or deflected by the first cam 88 in the direction of arrow 104 until the locking finger 80 may snap back in the direction of arrow 106 to a position longitudinally aligned with the locking recess 92 of the finger lock. When the actuator handle 58 is released, the locking finger nose 82 is trapped within the locking recess 92 of the finger lock 86. In this locked position, the actuator handle 58 cannot be rotated. Consequently, the actuator assembly 12 is locked against accidental or inadvertent opening of the drain plug.

IV. Conclusion

The above descriptions are those of current embodiments of the invention. Various alterations and changes can be made without departing from the spirit and broader aspects of the invention as defined in the appended claims, which are to be interpreted in accordance with the principles of patent law including the doctrine of equivalents.

This disclosure is illustrative and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as alternatives.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A watercraft drain plug system comprising:
   a drain plug assembly including a drain plug housing and a drain plug, the drain plug housing adapted to be secured in a hull of a watercraft, the drain plug being moveable within the drain plug housing between an open position permitting water to flow through the drain plug housing and a closed position prohibiting water from flowing through the drain plug housing;
   a cable assembly having a drain plug end and an actuator end, the drain plug end operatively connected to the drain plug to move the drain plug between the open position and the closed position; and
   an actuator assembly adapted to be secured within the interior of the watercraft, the actuator assembly including an actuator and a locking mechanism, the actuator end of the cable assembly operatively connected to the actuator, the actuator controlling the drain plug through the cable assembly, the actuator moveable between a first position in which the drain plug is in the open position and a second position in which the drain plug is in the closed position, the locking mechanism selectively securing the actuator in the second position to prevent inadvertent movement of the actuator from the second position to the first position, and thereby to prevent inadvertent movement of the drain plug from the closed position to the open position.

2. A watercraft drain plug system comprising:
   a drain plug assembly including a drain plug housing and a drain plug, the drain plug housing adapted to be secured in a hull of a watercraft, the drain plug being moveable within the drain plug housing between an open position permitting water to flow through the drain plug housing and a closed position prohibiting water from flowing through the drain plug housing;
   a cable assembly having a drain plug end and an actuator end, the drain plug end operatively connected to the drain plug to move the drain plug between the open position and the closed position; and
   an actuator assembly adapted to be secured within the interior of the watercraft, the actuator assembly including an actuator and a locking mechanism, the actuator end of the cable assembly operatively connected to the actuator, the actuator controlling the drain plug through the cable assembly, the actuator moveable between a first position in which the drain plug is in the open position and a second position in which the drain plug is in the closed position, the locking mechanism selectively securing the actuator in the second position to prevent inadvertent movement of the actuator from the second position to the first position, and thereby to prevent inadvertent movement of the drain plug from the closed position to the open position, the locking mechanism being spring-loaded to positively retain the actuator in the first position and the second position.

3. A watercraft drain plug system comprising:
   a drain plug assembly including a drain plug housing and a drain plug, the drain plug housing adapted to be secured in a hull of a watercraft, the drain plug being moveable within the drain plug housing between an open position permitting water to flow through the drain plug housing and a closed position prohibiting water from flowing through the drain plug housing, the drain plug assembly including a second drain plug housing and a second drain plug;

a cable assembly having a drain plug end and an actuator end, the drain plug end operatively connected to the drain plug to move the drain plug between the open position and the closed position, the drain plug end of the cable assembly additionally operatively connected to the second drain plug; and an actuator assembly adapted to be secured within the interior of the watercraft, the actuator assembly including an actuator and a locking mechanism, the actuator end of the cable assembly operatively connected to the actuator, the actuator controlling the drain plug through the cable assembly, the actuator moveable between a first position in which the drain plug is in the open position and a second position in which the drain plug is in the closed position, the locking mechanism selectively securing the actuator in the second position to prevent inadvertent movement of the actuator from the second position to the first position, and thereby to prevent inadvertent movement of the drain plug from the closed position to the open position, the actuator additionally controlling the second drain plug, whereby movement of the actuator between the first position and the second position results in movement of the first and second drain plugs between the open position and the closed position.

4. A watercraft drain plug system as defined in claim 3 wherein the cable assembly includes:
   an inlet cable having the actuator end;
   first and second outlet cables having the drain plug end; and
   a junction box, the inlet cable and the first and second outlet cables operatively connected to the junction box, whereby movement of the inlet cable results in movement of the first and second outlet cables.

5. A watercraft drain plug system comprising:
   a drain plug assembly including first and second drain plug housings and first and second drain plugs within the first and second drain plug housing respectively, the first and second drain plug housings adapted to be secured in a hull of a watercraft, the first and second drain plugs being moveable within the first and second drain plug housings between an open position permitting water to flow through the first and second drain plug housings and a closed position prohibiting water from flowing through the first and second drain plug housings;
   a cable assembly having a drain plug end and an actuator end, the drain plug end operatively connected to the first and second drain plugs to move the first and second drain plugs between the open position and the closed position; and
   an actuator assembly adapted to be secured within the interior of the watercraft, the actuator assembly including an actuator, the actuator end of the cable assembly operatively connected to the actuator, the actuator controlling the first and second drain plugs through the cable assembly, the actuator being moveable between a first position in which the first and second drain plugs are in the open position and a second position in which the first and second drain plugs are in the closed position, whereby movement of the actuator between the first position and second position results in movement of the first and second drain plugs between the open position and the closed position.

6. A watercraft drain plug system as defined in claim 5 wherein the cable assembly includes:
   an inlet cable having the actuator end;
   first and second outlet cables having the drain plug end; and
   a junction box, the inlet cable and the first and second outlet cables being operatively connected to the junction box, whereby movement of the inlet cable results in movement of the first and second outlet cables.

7. A watercraft drain plug system as defined in claim 5 wherein the actuator assembly includes a locking mechanism selectively securing the actuator in the second position to prevent inadvertent movement of the actuator from the second position to the first position, and thereby to prevent inadvertent movement of the first and second drain plugs from the closed position to the open position.

8. A watercraft drain plug system as defined in claim 7 wherein the locking mechanism is spring-loaded to positively retain the actuator in the first position and the second position.

\* \* \* \* \*